US007016862B1

(12) United States Patent
Vassigh et al.

(10) Patent No.: US 7,016,862 B1
(45) Date of Patent: Mar. 21, 2006

(54) METHOD FOR ENHANCING SECURITY AND PROVIDING ASSISTANCE IN THE OPERATION OF A SELF-SERVICE CHECKOUT TERMINAL

(75) Inventors: Ali M. Vassigh, Lawrenceville, GA (US); Joanne S. Walter, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/020,057

(22) Filed: Feb. 6, 1998

Related U.S. Application Data

(60) Provisional application No. 60/037,726, filed on Feb. 7, 1997, provisional application No. 60/037,725, filed on Feb. 7, 1997.

(51) Int. Cl.
*G06F 17/00* (2006.01)
(52) U.S. Cl. .............................. 705/17; 705/14; 705/15; 705/16; 705/20; 705/21; 705/22; 705/23; 186/61; 186/66; 186/68; 16/66; 235/379; 235/380; 235/383
(58) Field of Classification Search ................. 705/17, 705/16, 20, 21, 22, 23, 14; 186/61, 66, 68; 16/66; 235/383, 379, 380
See application file for complete search history.

(56) References Cited

U.S. PATENT DOCUMENTS

| | | | | |
|---|---|---|---|---|
| 4,628,452 A | * | 12/1986 | Shiono et al. ................. | 705/16 |
| 4,779,706 A | * | 10/1988 | Mergenthaler ................ | 186/61 |
| 4,799,706 A | * | 1/1989 | Myers et al. ................. | 280/504 |
| 5,173,851 A | * | 12/1992 | Off et al. ....................... | 705/14 |
| 5,832,458 A | * | 11/1998 | Jones ........................... | 705/14 |
| 5,905,246 A | * | 5/1999 | Fajkowski ................... | 235/375 |

FOREIGN PATENT DOCUMENTS

| | | |
|---|---|---|
| EP | 623904 A1 * | 11/1994 |
| WO | WO 9823195 A1 * | 6/1998 |

OTHER PUBLICATIONS

Bennett, Stephen, "To catch a thief", Progressive Grocer, v69, n7, p30(5), Jun. 1990.*
Robins, Gary, "Dominick's front-end solution", Stores, v76n10, pp: 90-92, Oct. 1994.*
"H-E-B Sets Broad Plan To cut Loss From Shrink", Supermarket News, v45, n51, p19+.*

* cited by examiner

Primary Examiner—Vincent Millin
Assistant Examiner—Nga B. Nguyen
(74) Attorney, Agent, or Firm—Maginot, Moore & Beck LLP

(57) ABSTRACT

A method of providing security during operation of a self-service checkout terminal includes the step of creating a transaction table which includes a plurality of records corresponding respectively to a plurality of items entered into the checkout terminal during a checkout procedure. The method also includes the step of analyzing the plurality of records. The method further includes the step of generating a characteristic value in response to the analyzing step. Moreover, the method includes the step of comparing the characteristic value to a characteristic trigger point and generating a characteristic control signal in response thereto.

30 Claims, 13 Drawing Sheets

METHOD FOR ENHANCING SECURITY AND PROVIDING ASSISTANCE IN THE OPERATION OF A SELF-SERVICE CHECKOUT TERMINAL

This application claims the benefit of U.S. Provisional Application No. 60/037,726, filed Feb. 7, 1997, and U.S. Provisional Application No. 60/037,725, filed Feb. 7, 1997.

CROSS REFERENCE

Cross reference is made to copending U.S. patent application Ser. No. 09/020,056, entitled "Self-Service Checkout Terminal" by Stephen Swaine, Ali Vassigh, and Grant Paton, which is assigned to the same assignee as the present invention, and which is filed concurrently herewith.

BACKGROUND OF THE INVENTION

The present invention relates generally to a checkout or point-of-sale (POS) terminal, and more particularly to a method and apparatus for enhancing security and providing assistance in the operation of a self-service checkout terminal.

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers.

It is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary supervision and security. Such supervision and security includes preventing a customer from either inadvertently or intentionally placing an item in a grocery bag without scanning the item, or scanning one item, but placing a second item of greater value in the bag. Thus, another concern when evaluating a self-service checkout terminal is the level of security provided against illicit use of the self-service checkout terminal by customers.

Therefore, self-service checkout terminals have heretofore been designed with supervision and security mechanisms which monitor the use of the self-service checkout terminal. For example, video cameras have been incorporated into self-service checkout terminals to monitor the manner in which a customer enters product information associated with an item (e.g. scanning or weighing the item). In particular, the video camera is positioned proximate the self-service checkout terminal and is coupled via a closed circuit video connection to an office or other area in the store in order to allow a security officer or the like to monitor the manner in which the customer enters information associated with an item. The manner in which a customer enters such information may be indicative of the customer's intentions when using the self-service checkout terminal. For example, if the customer places a number of items in a grocery bag, but the security officer did not see an attempt by the customer to actually scan the item, it may be inferred that the customer is attempting to commit an impropriety such as theft. However, if the customer actually made an attempt to scan the item, but was unsuccessful in doing so, it may be inferred that the customer's intentions were not illicit, but that the customer may actually be in need of assistance from the retailer's personnel.

Supervision and security mechanisms such as the one described above have heretofore been designed typically to consider only those characteristics associated with the manner in which a customer checks out (e.g. scans or weighs) an item through the self-service checkout terminal. However, it may also be desirable to monitor the quantity, type, and/or value of items checked out through the self-service checkout terminal, as opposed to only the manner in which the items were checked out. For example, it may be desirable to monitor situations such as when the customer enters a large number of coupons the total value of which exceeds a large percentage of the total value of the items included in the transaction.

What is needed therefore is a self-service checkout terminal which assists or otherwise supervises a customer in the use thereof. What is further needed is a self-checkout terminal which provides security from theft and other improprieties by monitoring the quantity, type, and/or value of the items being checked out.

SUMMARY OF THE INVENTION

According to a first embodiment of the present invention, there is provided a method of providing security during operation of a self-service checkout terminal. The method includes the step of creating a transaction table which includes a plurality of records corresponding respectively to a plurality of items entered into the checkout terminal during a checkout procedure. The method also includes the step of analyzing the plurality of records. The method further includes the step of generating a characteristic value in response to the analyzing step. Moreover, the method includes the step of comparing the characteristic value to a characteristic trigger point and generating a characteristic control signal in response thereto.

According to a second embodiment of the present invention, there is provided a method of providing security during operation of a self-service checkout terminal. The method includes the step of creating a transaction table which includes a plurality of records corresponding respectively to a plurality of items entered into the checkout terminal during a checkout procedure. The method also includes the step of analyzing the plurality of records to determine the number of identical records of a respective item contained in the plurality of records. The method further includes the step of generating an identical item value in response to the analyzing step. Moreover, the method includes the step of comparing the identical item value to an identical item trigger point and generating an identical item control signal in response thereto.

According to a third embodiment of the present invention, there is provided a method of providing security during operation of a self-service checkout terminal. The method includes the step of creating a transaction table which includes a plurality of records corresponding respectively to a plurality of items entered into the checkout terminal during a checkout procedure. The method also includes the step of analyzing the plurality of records to determine the average dollar amount of the items contained in the plurality of records. The method further includes the step of generating an average item value in response to the analyzing step. Moreover, the method includes the step of comparing the average item value to an average item trigger point and generating an average item control signal in response thereto.

It is therefore an object of the present invention to provide a new and useful method for enhancing security and providing assistance in the operation of a self-service checkout terminal.

It is a further object of the present invention to provide an improved method for enhancing security and providing assistance in the operation of a self-service checkout terminal.

It is also an object of the present invention to provide a self-service checkout terminal which assists or otherwise supervises a customer in the use thereof.

It is moreover an object of the present invention to provide a self-checkout terminal which provides security from theft and other improprieties by monitoring the quantity, type, and/or value of the items being checked out.

The above and other objects, features, and advantages of the present invention will become apparent from the following description and the attached drawings.

DETAILED DESCRIPTION OF THE INVENTION

Figure 1:
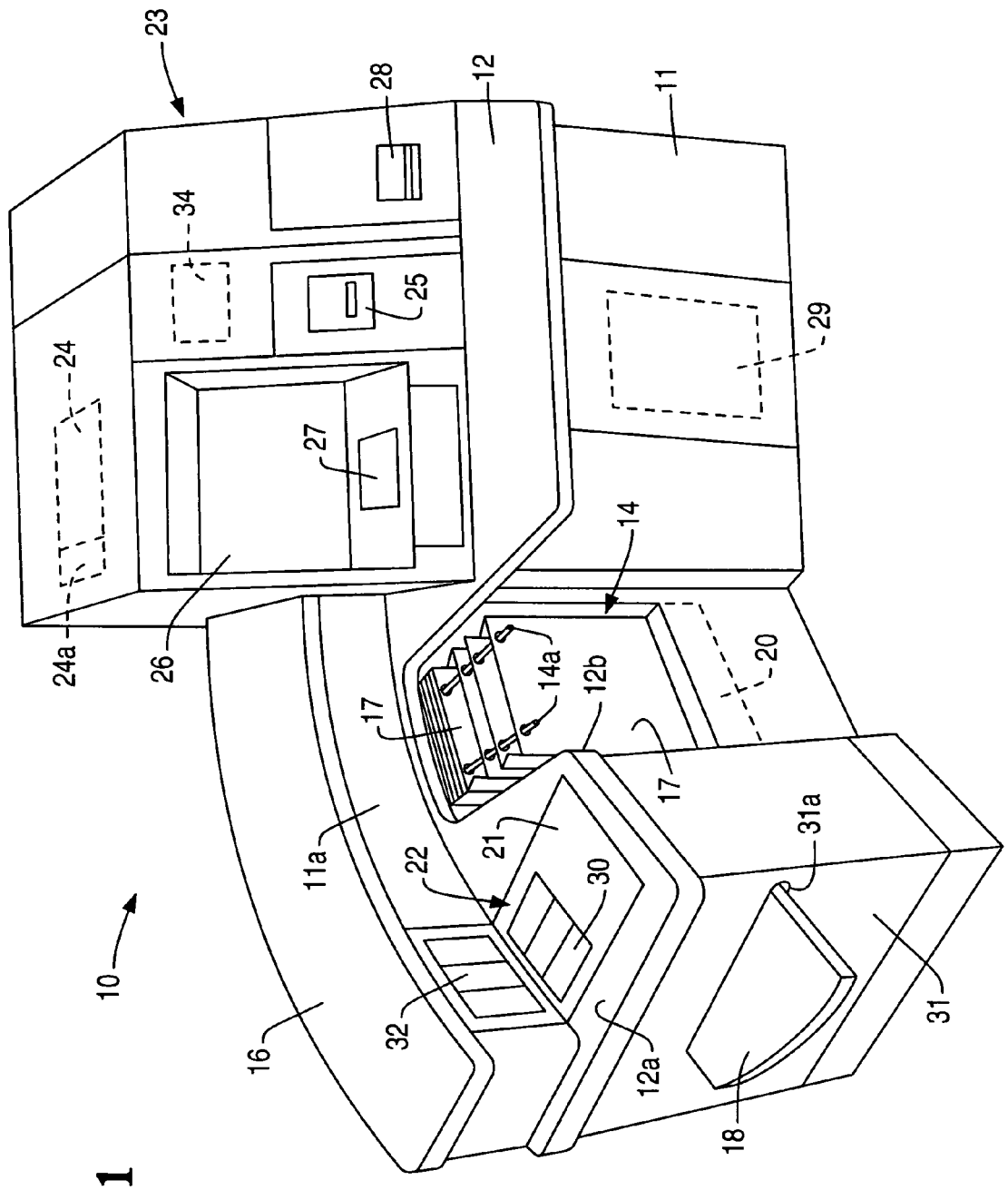
FIG. 1 is a perspective view of a self-service checkout terminal which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
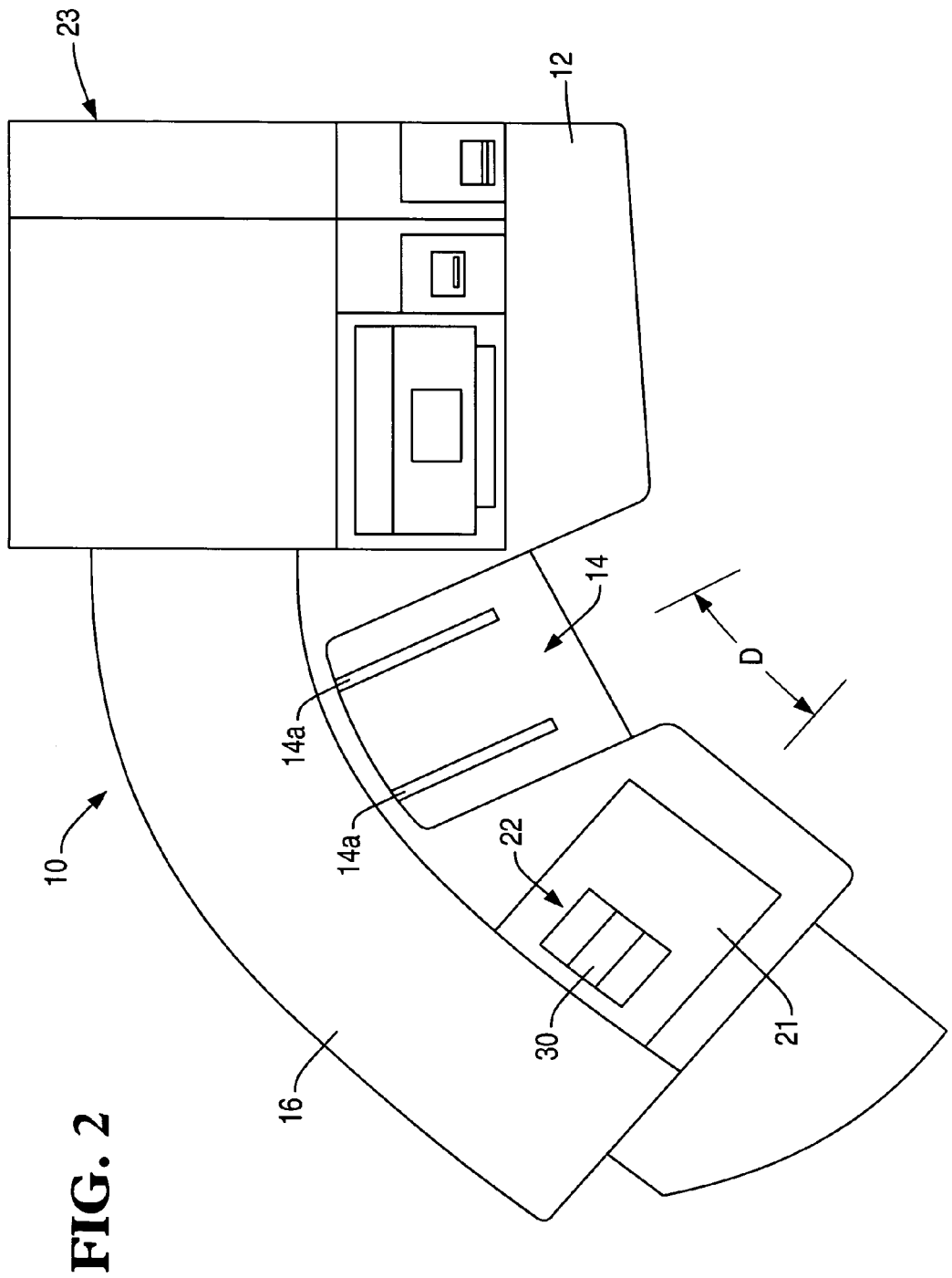
FIG. 2 is a top elevational view of the self-service checkout terminal of FIG. 1 (Note: the grocery bags 17 have been removed for clarity of description)

Referring now to FIGS. 1 and 2, there is shown a self-service checkout terminal 10 for use in a retail business such as a grocery store. The self-service checkout terminal 10 includes a base 11, a first counter 12 supported on the base 11, a bagwell 14 defined in the base 11 for accommodating one or more grocery bags 17, a second counter 16, a basket shelf 18, a bag scale 20 positioned within the bagwell 14, a product scale 21, a scanner 22, an automated teller machine (ATM) 23, and a processing unit 29. The ATM 23 includes a video system 24, a card reader 25, a display monitor 26, a data input device 27, and a printer 28.

The scanner 22 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 22 includes a first scanning window 30 and a second scanning window 32. The first scanning window 30 is disposed flush-mounted relative to an upper surface 12a of the counter 12. The second scanning window 32 is disposed flush-mounted relative to a connecting panel 11a of the base 11 in a substantially perpendicular fashion relative to the upper surface 12a of the counter 12. The product scale 21 is integrated with the scanner 22. More specifically, the product scale 21 is flush-mounted relative to the upper surface 12a of the counter 12 and envelops the scanning window 30. If an item such as produce is placed upon the product scale 21 or the scanning window 30, the product scale 21 may be used to determine the weight of the item.

The scanner 22 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 22, the scanning light beams scatter off the code and are returned to the scanner 22 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

A video camera 24a of the video system 24 is disposed above the counters 12, 16 and is positioned for detecting motion within a "target area" of the video system 24. What is meant herein by use of the term "target area" of the video system 24 is an area across which the video system 24 is capable of detecting motion. For example, a first target area is defined by the maximum range in which an item can be successfully scanned as it is passed across the scanner 22. A second target area is defined by an area proximate the bagwell 14. It should therefore be appreciated that motion proximate the bagwell 14 is indicative of an item being placed into or removed from one of the grocery bags 17. A third target area is defined by an area proximate the ATM 23. Motion proximate the ATM 23 is indicative of a customer attempting to use a component of the ATM 23 such as the data input device 27.

The display monitor 26 displays instructions which serve to guide a customer through a checkout procedure. For example, an instruction is displayed on the display monitor 26 which instructs the customer to remove an item from a grocery cart or trolley (not shown) and pass the item over the scanner 22. If the scanner 22 successfully scans or reads the product identification code associated with the item, then a visual indication is generated on the display monitor 26. If for any reason the scanner 22 cannot read or otherwise determine the product identification code associated with the item, a visual error message is generated on the display monitor 26. Moreover, the display monitor 26 may be a known touch screen monitor which can generate data signals when certain areas of the screen are touched by a user.

In addition to the display monitor 26, a voice generating device 34 is included in the self-service checkout terminal 10 to provide audio feedback to the customer during the checkout procedure. In particular, if a customer successfully scans or otherwise enters product information associated with an item, an audible message is generated on the voice generating device 34 which informs the customer of information associated with the item such as description and price. Therefore, the voice generating device 34 allows the customer to obtain information associated with each item being entered without requiring the customer to look at the display monitor 26 after scanning each item thereby increasing the customer's efficiency in operating the self-service checkout 10.

The counter 16 defines an arcuate surface as shown in FIG. 2. What is meant herein by the term "arcuate surface" is a surface which possess a curved or bowed shape. Such an arcuate surface allows the counter 16 to be positioned relatively close to both the scanner 22 and the bagwell 14 thereby permitting the counter 16 to function as a "set-aside surface" for use by the customer during operation of the self-service checkout terminal 10. What is meant herein by the term "set-aside surface" is a surface on which items which have been scanned or otherwise entered may be temporarily placed prior to being loaded into one of the grocery bags 17 in the bagwell 14.

Such set-aside surfaces are necessary to allow the customer to selectively choose the order in which items are loaded into the grocery bags 17. For example, if the customer scanned a loaf of bread, the customer may wait to load the bread into the grocery bag 17 until the bag is nearly full thereby preventing the bread from being crushed.

It should be appreciated that other surfaces included in the self-surface checkout terminal 10 may also be used as set-aside surfaces. For example, a portion of the counter 12 proximate the ATM 23 may also be used by a customer as a set-aside surface.

The bagwell 14 is disposed between the scanner 22 and the ATM 23 as shown in FIG. 1. In particular, the counter 12 has a bagwell opening 12b defined therein at a location interposed between the scanner 22 and the ATM 23. The bagwell 14 is defined in the base 11 at a location in which the bagwell 14 is aligned with the bagwell opening 12b. Moreover, the bagwell 14 includes a number of posts 14a which cooperate to support a number of the grocery bags 17. The bagwell 14 is configured to allow two or more grocery bags 17 to be accessed by the customer at any given time. In particular, the posts 14a are of a sufficient length to secure a number of unopened grocery bags 17 along with two or more opened grocery bags 17 thereby allowing a customer to selectively load various item types into the grocery bags 17. For example, the customer may desire to use a first grocery bag 17 for household chemical items such as soap or bleach and a second grocery bag 17 for edible items such as meat and produce.

The bagwell 14 is positioned proximate the scanner 22 and the product scale 21. In particular, the center of the bagwell 14 is separated from the center of the scanner 22 by a distance D as shown in FIG. 2. It should be appreciated that the distance D is predetermined to be small enough in magnitude in order to be within a customer's arm reach thereby allowing the customer to move items from the scanner 22 and/or the product scale 21, and into the grocery bags 17 while remaining stationary.

Figure 3:
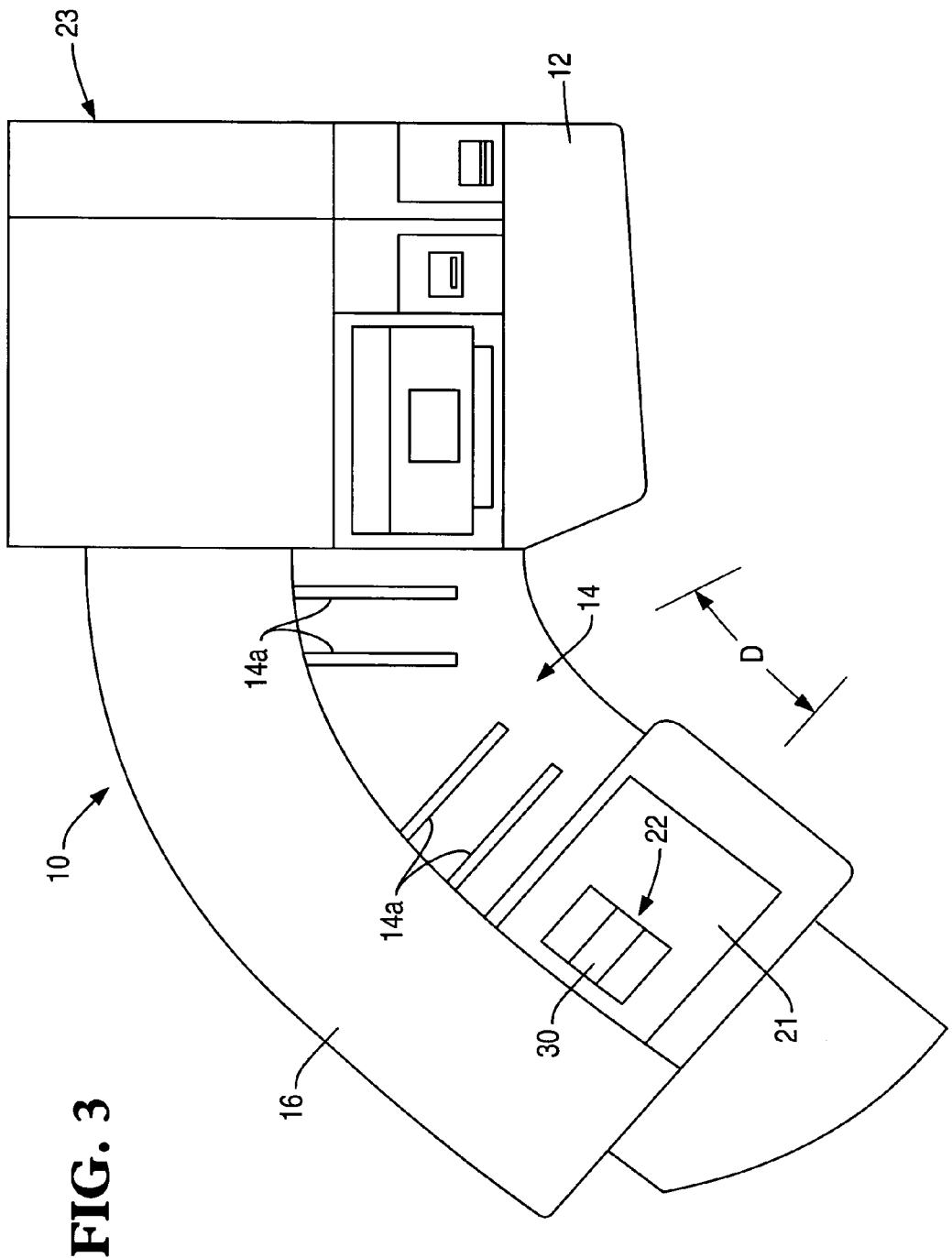
FIG. 3 is a view similar to FIG. 2, but showing a first alternate configuration of the bagwell 14.
Figure 4:
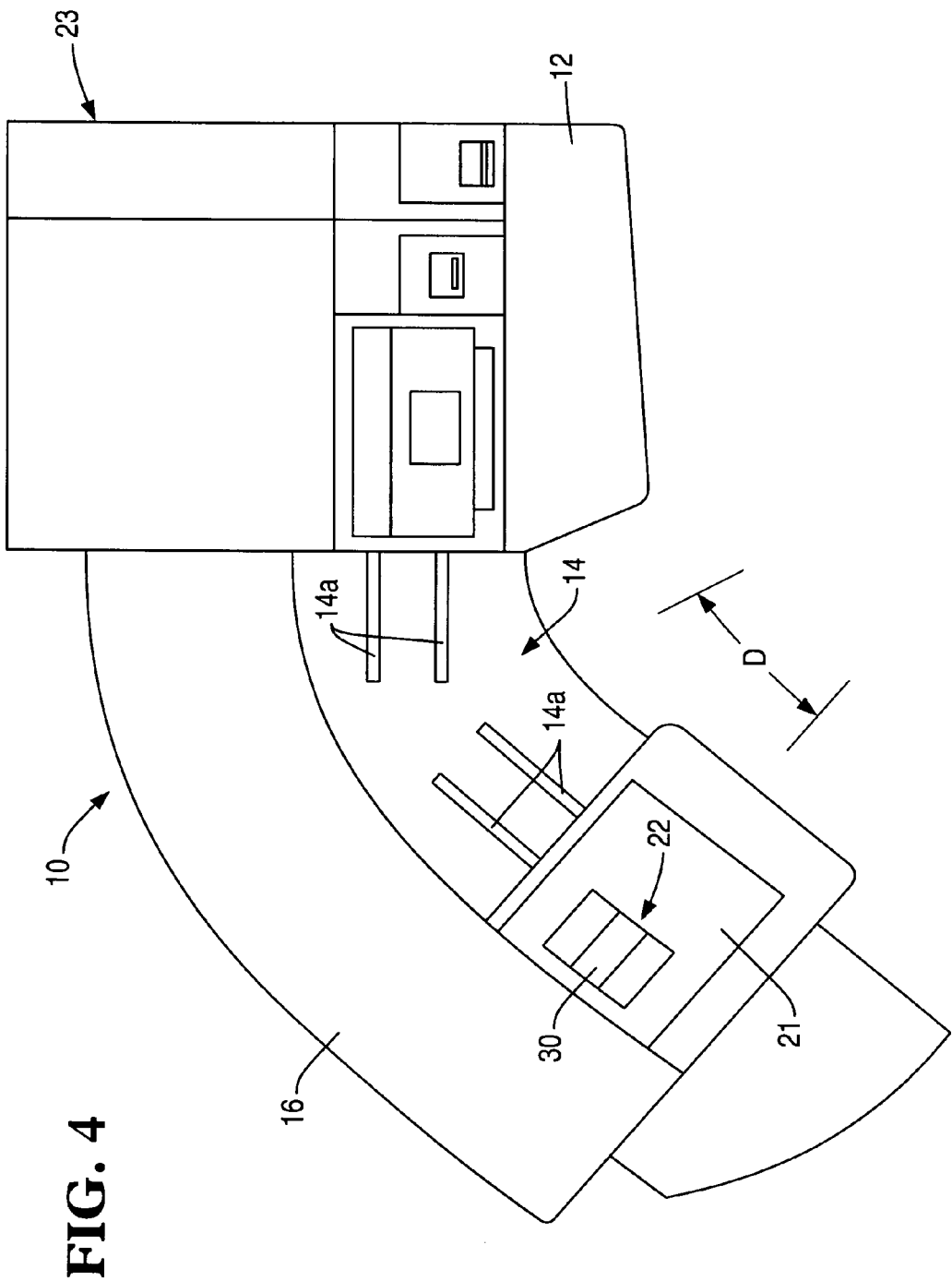
FIG. 4 is a view similar to FIG. 2, but showing a second alternate configuration of the bagwell 14.
Figure 5:
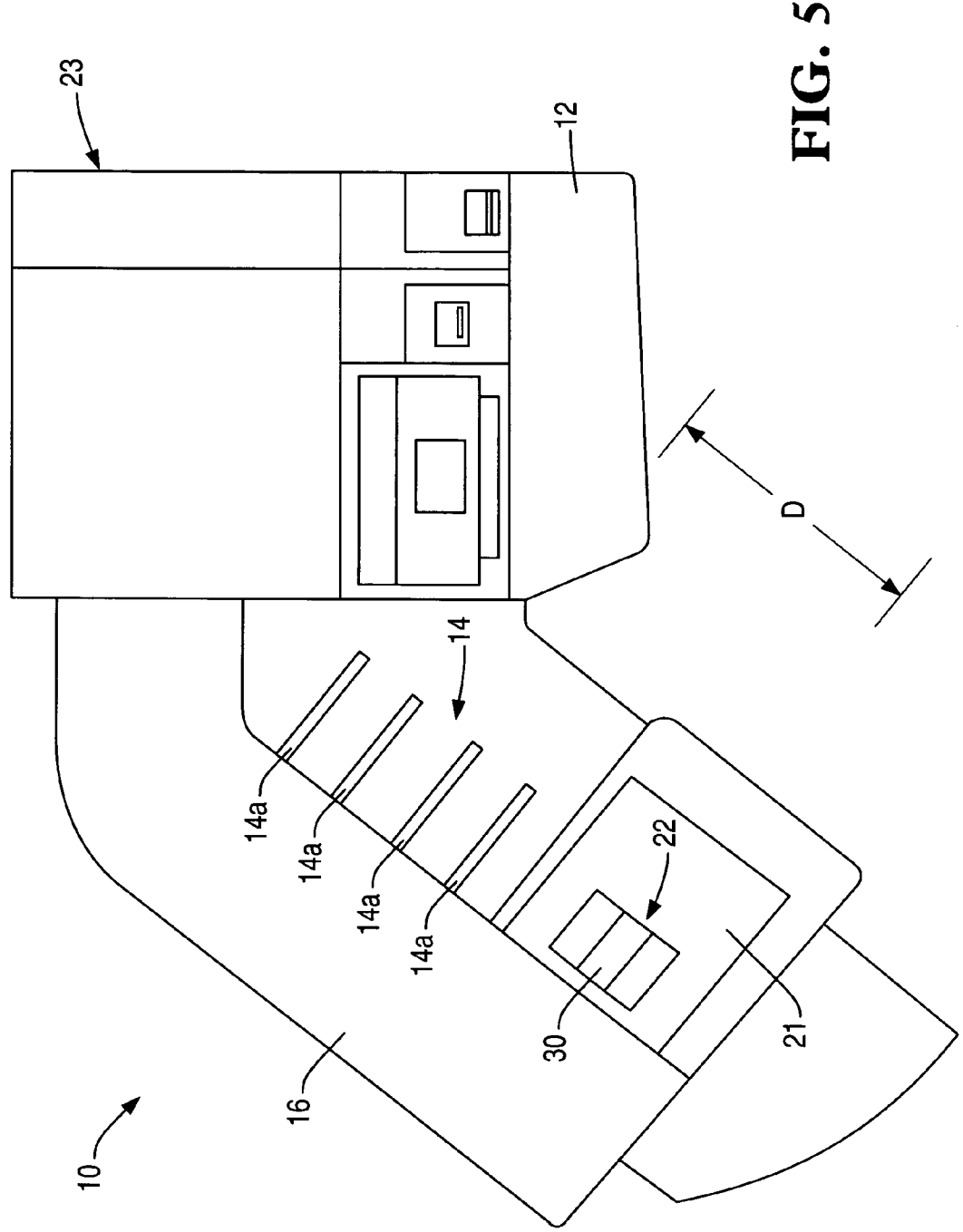
FIG. 5 is a view similar to FIG. 2, but showing a third alternate configuration of the bagwell 14.

Various configurations of the bagwell 14 are contemplated for use in the self-service checkout terminal 10. More specifically, the configuration of the bagwell 14 may be altered to facilitate the incorporation thereof into a specific design of the self-service checkout terminal 10 as shown in FIGS. 3–5. For example, the number and orientation of the posts 14a may be altered, as shown in FIG. 4, in which two pairs of the posts 14a are positioned so as to extend inwardly and be opposed to one another.

Returning now to FIGS. 1–2, the bag scale 20 weighs the contents of the one or more of the grocery bags 17 which are positioned on the bag scale 20 during a checkout procedure. The bag scale 20 is used for monitoring the insertion of items into and the removal of items from the grocery bags 17. Such monitoring may be used in a security system associated with operation of the self-service checkout terminal 10.

The basket shelf 18 is slidably engaged with a side panel 31 of the base 11. In particular, the basket shelf 18 may be positioned in an extended position (as shown in FIG. 1) thereby allowing the customer to place a shopping or hand basket (not shown) or the like thereon during the checkout procedure. Alternatively, the basket shelf may be positioned in a retracted position in which the basket shelf 18 is slid into a slot 31a defined in the side panel 31 thereby allowing the customer to position a shopping cart (not shown) adjacent the side panel 31 in order to facilitate the unloading of items from the cart during the checkout procedure.

Figure 6:
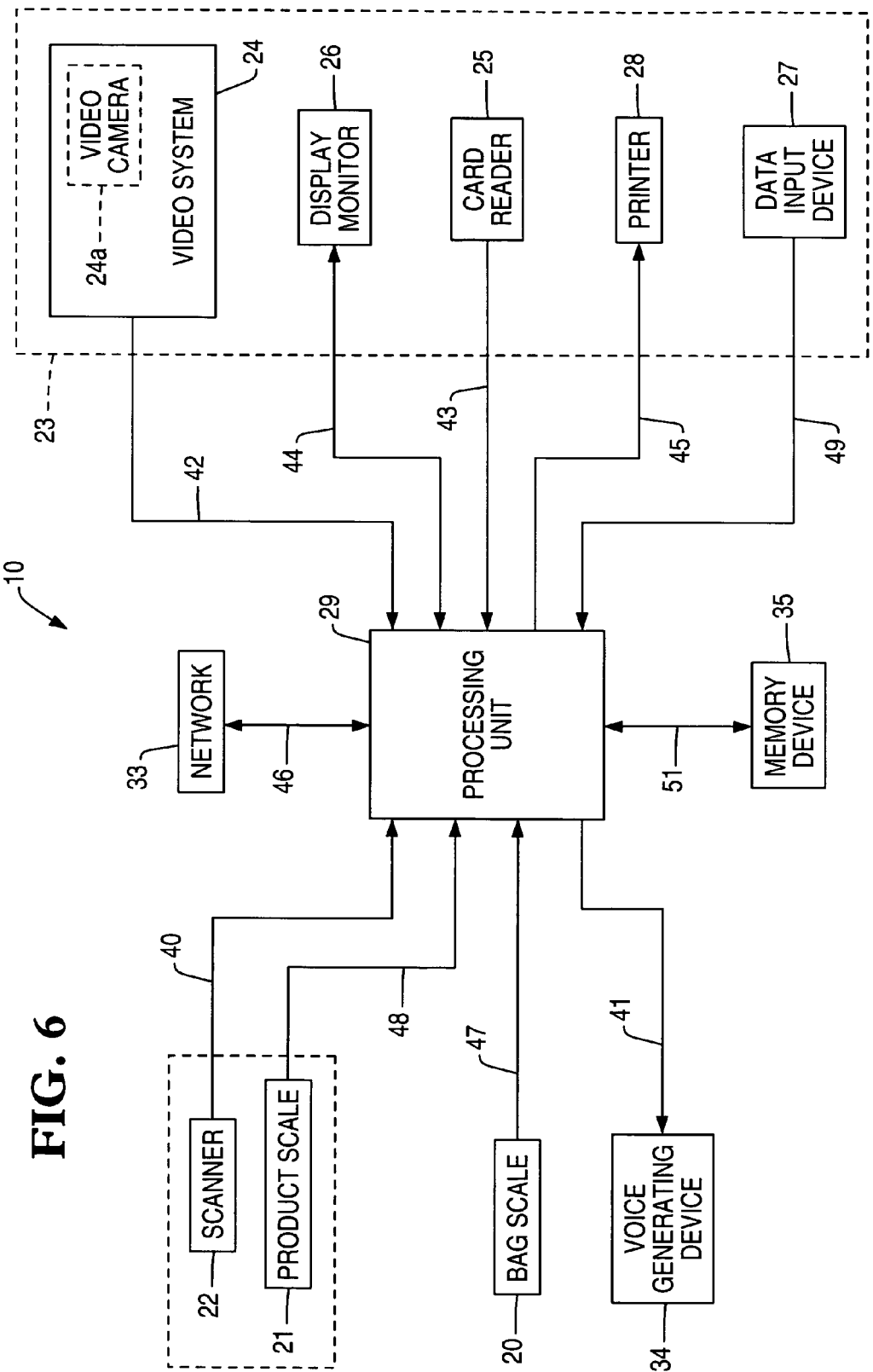
FIG. 6 is a simplified block diagram of the self-service checkout terminal of FIG. 1.

Referring now to FIG. 6, there is shown a simplified block diagram of the self-service checkout terminal 10. The processing unit 29 is electrically coupled to the bag scale 20, the product scale 21, the scanner 22, the video system 24, the card reader 25, the display monitor 26, the data input device 27, the printer 28, and the voice generating device 34. The processing unit 29 is also electrically coupled to a network 33 and a memory device 35 as shown in FIG. 1.

The processing unit 29 monitors output signals generated by the scanner 22 and the video system 24 through communication lines 40 and 42, respectively, so as to supervise and provide security monitoring of a checkout procedure as described further below.

The processing unit 29 communicates with the display monitor 26 through a data communication line 44. The processing unit 29 generates output signals on the data communication line 44 which cause various instructional messages to be displayed on the display monitor 26. The display monitor 26 may include known touch screen technology which can generate output signals when the customer touches a particular area of the display screen associated with the display monitor 26. The signals generated by the display screen are transmitted to the processing unit 29 via the data communication line 44.

The processing unit 29 is coupled to the product scale 21 via a data communication line 48, whereas the processing unit 29 is coupled to the bag scale 20 via a data communication line 47. Moreover, the processing unit 29 is coupled to the voice generating device 34 via a data communication line 41, whereas the processing unit 29 is coupled to the printer 28 via a data communication line 45.

The data input device 27 is coupled to the processing unit 29 through a data communication line 49. The data input device 27 may include one or more of a known keypad or a touch pad.

The card reader 25 is coupled to the processing unit through a data communication line 43. The card reader may include a known credit and/or debit card reader, or a smart card reader.

In addition to the video camera 24a, the video system 24 includes a frame grabber (not shown) and a processing system (not shown) such as a personal computer (PC). The PC and the frame grabber are collectively referred to as a video processor. The video processor receives a standard video signal format, such as RS-170, NTSC, CCIR, or PAL, from the video camera 24a.

Video output signals from the video camera 24a are input to the frame grabber. The frame grabber operates to convert the analog video signals from the video camera 24a into a digital image which is stored within a memory for subsequent processing by the video processor. Once representations of the stream of digital images from the video camera 24a are sequentially stored in memory, the video processor may begin to analyze or otherwise process the video image.

The processing unit 29 includes network interface circuitry (not shown) which conventionally permits the self-service checkout terminal 10 to communicate with the network 33 such as a LAN or WAN through a wired connection 46. The processing unit 29 communicates with the network 33 during the checkout procedure in order to communicate with a paging system (not shown) or the like which pages or otherwise alerts the retailer's personnel as described further below. In addition, the processing unit 29 communicates with the network 33 to obtain information such as pricing information on an item being scanned, and also to verify customer credit approval when appropriate. The network interface circuitry associated with the self-service checkout terminal 10 may include a known Ethernet expansion card, and the wired connection 46 may include a known twisted-pair communication line. Alternatively, the network interface circuitry may support wireless communications with the network 33.

The processing unit 29 communicates with the memory device 35 via a data communication line 51. The memory device 35 is provided to maintain an electronic transaction table which includes a record of the product information associated with each item which is scanned or otherwise entered during the customer's use of the self-service checkout terminal 10. For example, if the customer scans a can of soup, the description of the soup and the pricing information associated therewith is recorded in the transaction table in the memory device 35. Similarly, if a customer manually entered a product identification code via the data input device 27, the product information associated with the item would be recorded in the transaction table. Moreover, if a customer entered a coupon or voucher, the information associated therewith would also be recorded in the transaction table.

It should therefore be appreciated that the sum of each of the items recorded in the transaction table minus any reductions (e.g. coupons) is the amount that the customer pays for his or her transaction. Moreover, data stored in the transaction table is printed out on the printer 28 thereby generating a receipt for the customer at the end of his or her transaction.

Moreover, the memory device 35 is provided to maintain a number of electronic logs associated with operation of the self-service checkout terminal 10. More specifically, the memory device 35 electronically maintains an event log and a suspicion log.

The event log is provided to track or otherwise tally the number of occasions in which a given customer operates the self-service checkout terminal 10 improperly. In particular, the event log tracks those occasions in which the customer unintentionally operated the self-service checkout terminal 10 improperly, along with those occasions in which it can be inferred with a high degree of confidence that the customer intentionally operated the self-service checkout terminal 10 improperly for illicit purposes such as theft. For example, if the processing unit 29 determines that the customer scanned a number of items, but then later voided from the transaction a large portion of the items, an entry is made in the event log. This is true since the customer may have unintentionally miscalculated the total amount of the transaction and therefore scanned more items than he or she could pay for thereby necessitating that the customer remove some of the items from the transaction. However, the possibility does exist that the customer may have intentionally scanned items that he or she later voided in an attempt to commit theft. Therefore, an entry is made in the event log.

The suspicion log on the other hand, is provided to track or otherwise tally only the number of occasions in which a given customer operates the self-service checkout terminal 10 improperly, and it can be inferred with a high degree of confidence that the customer was intentionally operating the self-service checkout terminal 10 improperly for illicit reasons such as theft.

It should be appreciated that a predetermined threshold value may be established for both the event log and the suspicion log. More specifically, a retailer may establish a threshold value for each of the logs that once exceeded causes the processing unit 29 to communicate with the network 33 in order to page or otherwise alert the retailer's personnel as to certain events surrounding the operation of the self-service checkout terminal 10 by a given customer. For example, a customer service manager may be paged to assist the given customer if the event log exceeds a value of three. Moreover, a security officer may be paged to audit or otherwise investigate the given customer's transaction if the suspicion log exceeds a value of 1½.

Figure 7:
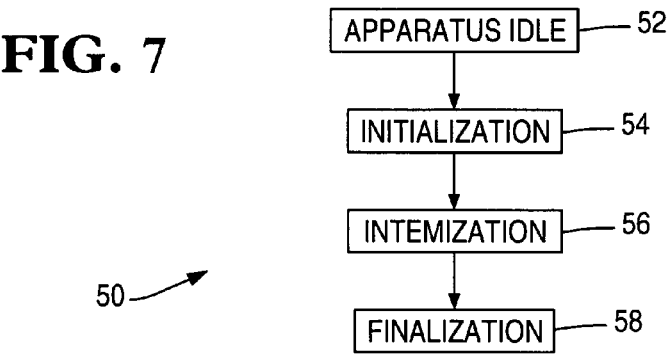
FIG. 7 is a flowchart setting forth a general procedure for checking out items through the self-service checkout terminal of FIG. 1.

Referring now to FIG. 7, there is shown a flowchart which sets forth a general procedure 50 for checking out items through the self-service checkout terminal 10. When a customer arrives at the self-service checkout terminal 10, the self-service checkout terminal 10 is in an idle state (step 52). An initialization step 54 is executed prior to checking out items for purchase. In particular, one or more initialization instructions are displayed on the display monitor 26 which instruct the customer to (1) touch a particular area of the display monitor 26 or push a particular button on the data input device 27 in order to select a desired method of payment, and/or (2) identify himself or herself by inserting a shopping card, debit card, credit card, or smart card into the card reader 25.

At the completion of the initialization step 54, the routine 50 advances to an itemization step 56 where the customer scans the individual items for purchase across the scanner 22, weighs and enters items for purchase with the product scale 21, manually enters product information associated with an item via the data input device 27, or enters information related to a coupon or voucher via the data input device 27 or the scanner 22 (if the coupon has a bar code printed thereon). At the completion of the itemization step, the routine 50 advances to a finalization step 58 in which (1) a grocery receipt is printed by the printer 28, and (2) payment is tendered by either charging a credit card or debit card account or decreasing an amount stored on a smart card via the card reader 25. After completion of the finalization step 58, the routine 50 returns to step 52 in which the self-service checkout terminal 10 remains in the idle condition until a subsequent customer initiates a checkout procedure.

Figure 8A:
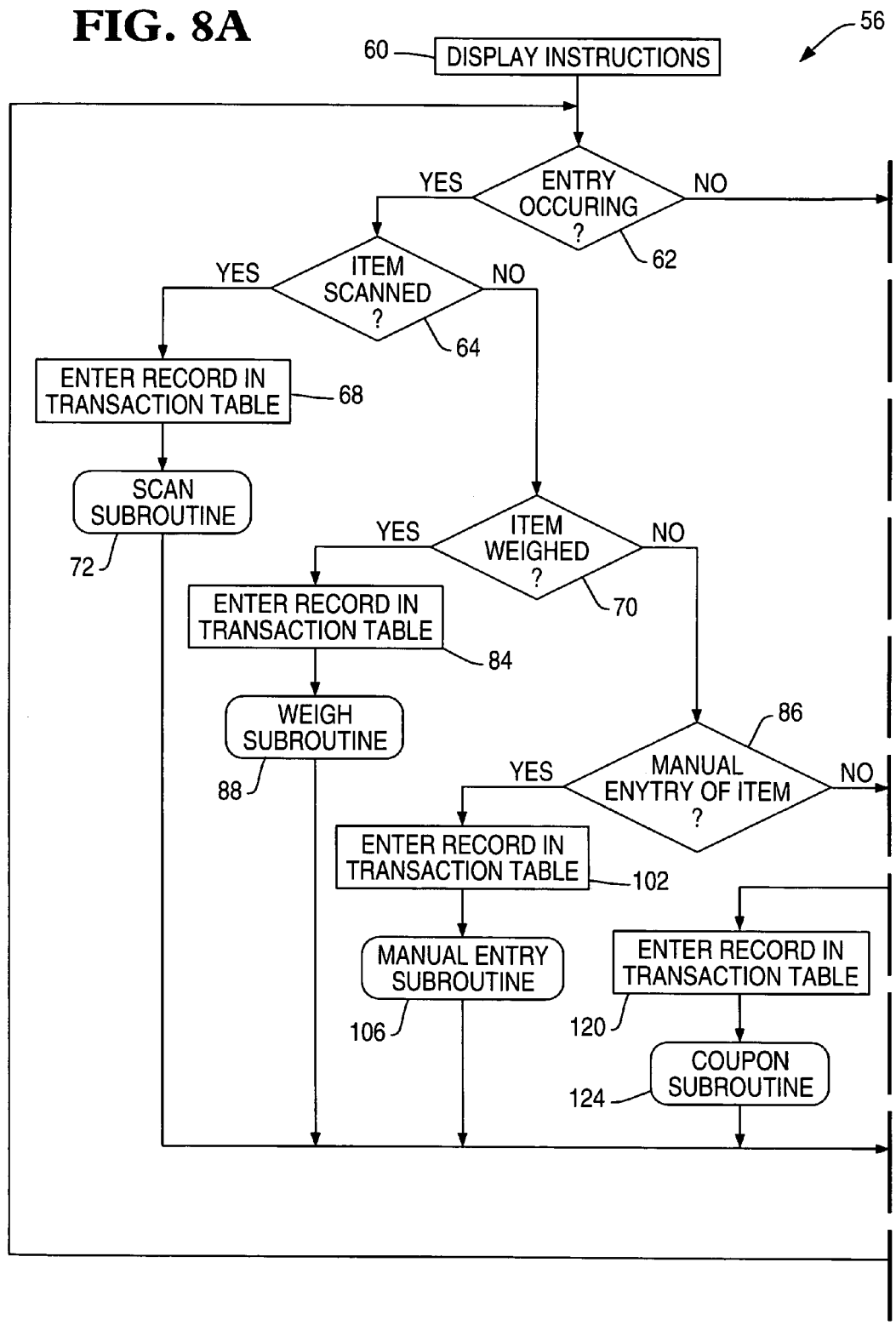
FIGS. 8A–8B are flowcharts setting forth in detail the itemization step of the general procedure of FIG. 7.
Figure 8B:
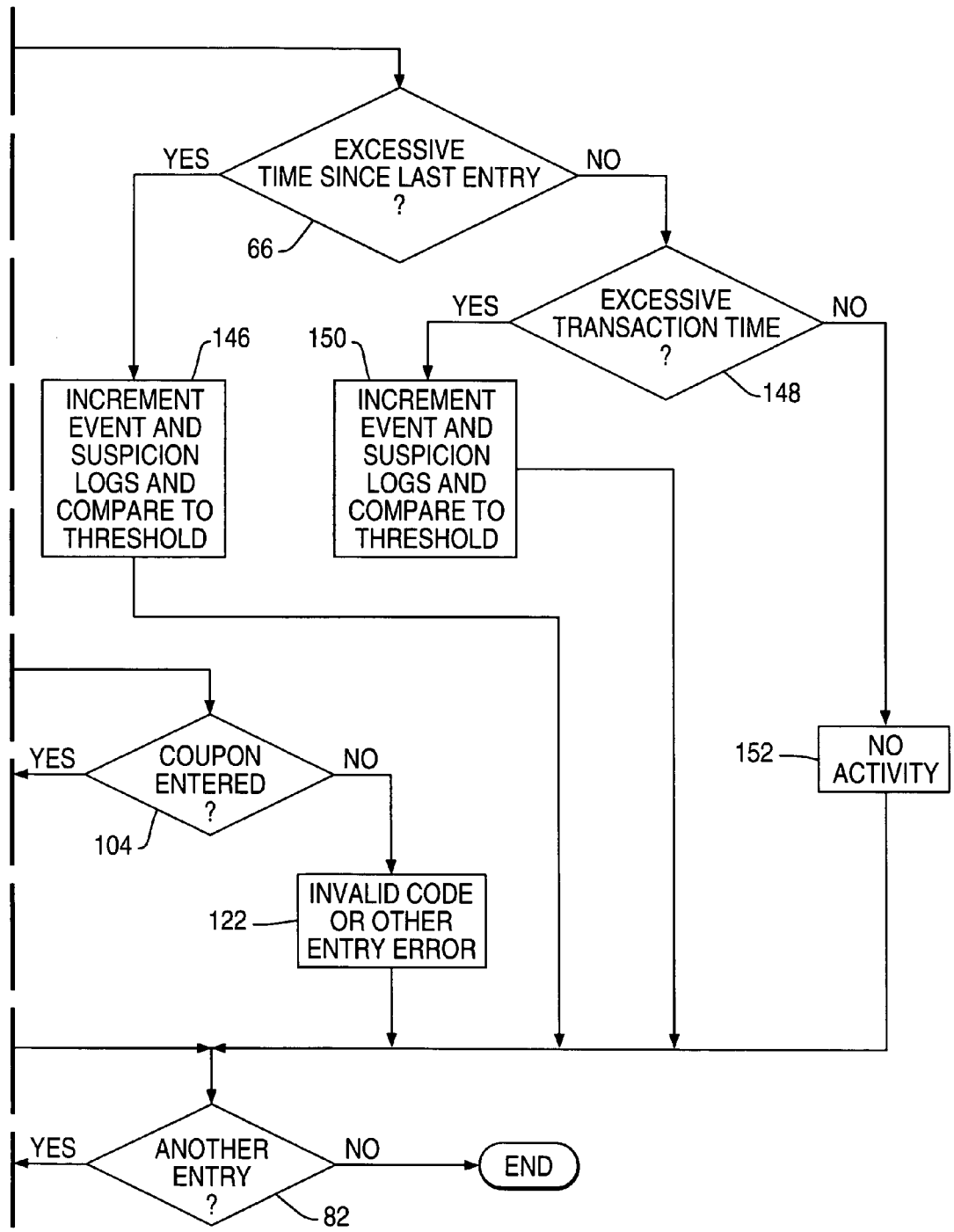

Referring now to FIG. 8, there is shown a flowchart setting forth the itemization step 56 in greater detail. After the initialization step 54 (see FIG. 7) is completed, the routine 56 advances to step 60 where a message is displayed on the display monitor 26 which instructs the customer to either (1) pass or otherwise scan individual items across or adjacent the scanner 22 with the product identification code facing the scanning windows 30, 32, (2) place an item on the product scale 21 in order to determine and enter the weight thereof, (3) manually enter product information associated with an item via the data input device 27, or (4) enter the code associated with a coupon via either the data input device 27 or the scanner 22.

The routine 56 then advances to step 62 where the processing unit 29 scans or reads the data communication lines 40, 48, and 49 to determine if the customer is either (1) scanning an item via the scanner 22, (2) placing an item on the product scale 21, or (3) operating the data input device 27. In particular, (1) the scanner 22 generates an output signal on the data communication line 40 once the customer scans an item, (2) the product scale 21 generates an output signal on the data communication line 48 once the customer places an item thereon, and (3) the data input device 27 generates an output signal on the data communication line 49 once a customer presses a key associated therewith. The presence of such output signals is indicative of a customer attempting to enter information associated with an item or a coupon. If such output signals are present, the routine 56 advances to step 64. If such output signals are not present, the routine 56 advances to step 66.

In step 64, the processing unit 29 scans or reads the data communication line 40 to determine whether the scanner 22 has successfully read or otherwise captured the product identification code associated with the item. More specifically, the scanner 22 generates an output signal which is sent to the processing unit 29 once the scanner 22 successfully reads the product identification code associated with the item. If the code is successfully read from the item, the routine 56 advances to step 68. If the code is not successfully read from the item, the routine 56 advances to step 70.

In step 68, the processing unit 29 adds a record of the item scanned in step 64 to the transaction table. In particular, the processing unit 29 communicates with the network 33 to obtain the product information (e.g. description and price) of the scanned item. Thereafter, the processing unit 29 updates the transaction table. More specifically, the processing unit 29 generates an output signal which is sent to the memory device 35 which causes the transaction table to be updated in the memory device 35 to include the product information associated with the scanned item. The routine 56 then advances to a scan subroutine 72.

Figure 9:
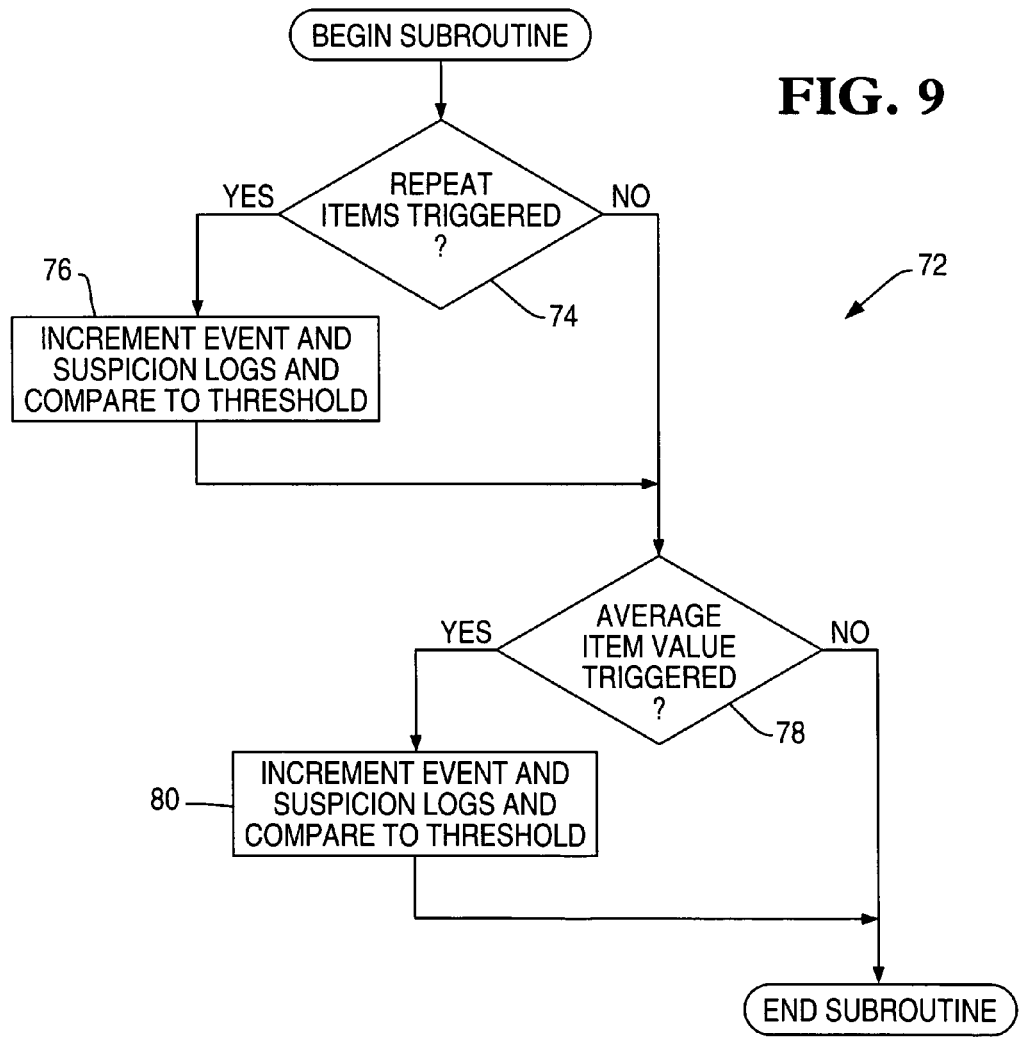
FIG. 9 is a flowchart setting forth in detail the scan subroutine 72 of the itemization step of FIG. 8.

Referring now to FIG. 9, there is shown a flow chart setting forth the scan subroutine 72 in greater detail. After completion of step 68 (see FIG. 8), the subroutine 72 advances to step 74. In step 74, the processing unit 29 determines if a trigger point associated with the number of identical items included in the transaction table has been exceeded. What is meant herein by the term "trigger point" is a predetermined, configurable value associated with a particular characteristic of the scanned or otherwise entered items or coupons that when exceeded causes the processing unit 29 to update the event and suspicion logs. In particular to step 74, the processing unit 29 communicates with the memory device 35 to determine the number of previously entered items in the transaction table that have identical product information associated therewith as the item that was scanned in step 64 (see FIG. 8). If the number of identical items in the transaction table exceeds the trigger point associated therewith, the subroutine 72 advances to step 76. If the number of identical items in the transaction table does not exceed the trigger point associated therewith, the subroutine 72 advances to step 78.

In step 76, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 72 then advances to step 78.

In step 78, the processing unit 29 determines if a trigger point associated with the average item value of the items in the transaction table has been exceeded. In particular, the processing unit 29 communicates with the memory device 35 to determine the average value of the items in the transaction table. If the average value of the items in the transaction table is below the trigger point associated therewith, the subroutine 72 advances to step 80. If the average value of the items in the transaction table is greater than the trigger point associated therewith, the subroutine 72 ends thereby advancing to step 82 of the routine 56 (see FIG. 8).

In step 80, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 72 then ends thereby advancing to step 82 in the routine 56 (see FIG. 8).

In step 82, the processing unit 29 monitors the communication line 49 from the data input device 27 and the communication line 44 from the display monitor 26 to determine whether the customer has more items to be entered. In particular, a message is displayed on the display monitor 26 instructing the customer to touch a particular touch screen area displayed on the display monitor 26, or to touch a particular key associated with the data input device 27, when the customer has completed entering all of the items for purchase.

If a particular signal is detected on either of the communication lines 44 or 49, the processing unit 29 determines that the checkout procedure is complete and the routine 56 advances to the finalization step 58 (see FIG. 7). If a particular signal is not detected on either the communication lines 44 or 49, the routine advances to step 62.

Returning now to step 64 (see FIG. 8), if an item is not scanned by the scanner 22, the routine 56 advances to step 70. In step 70, the processing unit 29 scans or reads the data line 48 to determine if a customer has weighed and thereby entered product information associated with an item via the product scale 21. More specifically, the product scale 21 generates an output signal which is sent to the processing unit 29 once the product scale 21 has detected the weight of an item being placed thereon. If the product scale 21 detects the weight of an item thereon, the routine 56 advances to step 84. If the product scale 21 does not detect the weight of an item thereon, the routine 56 advances to step 86.

In step 84, the processing unit 29 adds a record of the item weighed in step 70 to the transaction table. More specifically, the processing unit 29 communicates with the network 33 to obtain the product information (e.g. description and price) of the weighed item. Thereafter, the processing unit 29 updates the transaction table. More specifically, the processing unit 29 generates an output signal which is sent to the memory device 35 which causes the transaction table to be updated in the memory device 35 to include the product information associated with the weighed item. The routine 56 then advances to a weigh subroutine 88.

Figure 10:
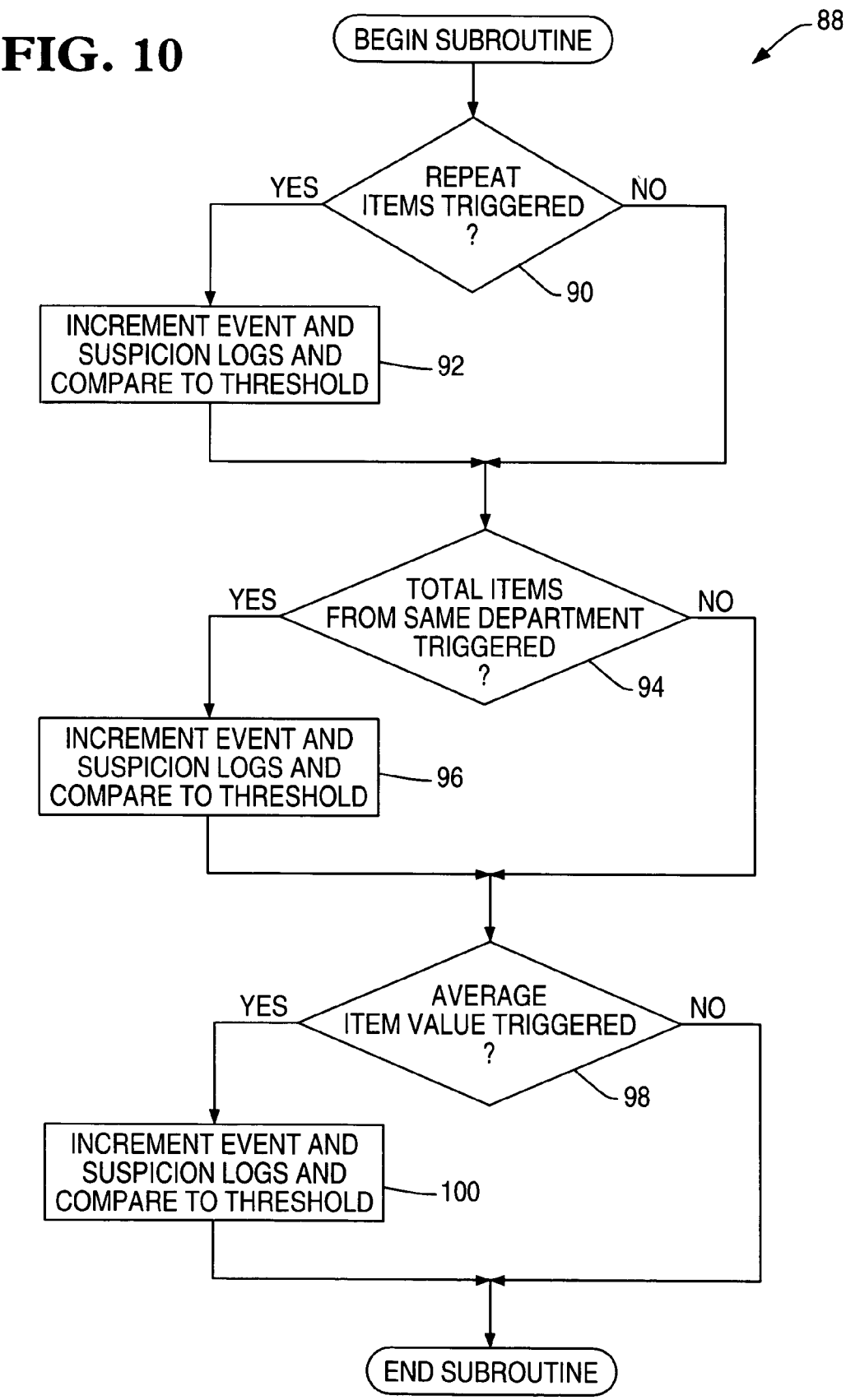
FIG. 10 is a flowchart setting forth in detail the weigh subroutine 88 of the itemization step of FIG. 8.

Referring now to FIG. 10, there is shown a flow chart setting forth the weigh subroutine 88 in greater detail. After completion of step 84 (see FIG. 8), the subroutine 88 advances to step 90. In step 90, the processing unit 29 determines if a trigger point associated with the number of identical items in the transaction table has been exceeded. In particular, the processing unit 29 communicates with the memory device 35 to determine the number of previously entered items in the transaction table that have identical product information associated therewith as the item that was weighed in step 70 (see FIG. 8). If the number of identical items in the transaction table exceeds the trigger point associated therewith, the subroutine 88 advances to step 92. If the number of identical items in the transaction table does not exceed the trigger point associated therewith, the subroutine 88 advances to step 94.

In step 92, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 88 then advances to step 94.

In step 94, the processing unit 29 determines if a trigger point associated with the number of items from a given department in the store (e.g. the meat department or the produce department) has been exceeded. In particular, the processing unit 29 communicates with the memory device 35 to determine the number of items in the transaction table that are from the same department. If the number of items in the transaction table that are from the same department is greater than the trigger point associated therewith, the subroutine 88 advances to step 96. If the number of items in the transaction table that are from the same department is less than the trigger point associated therewith, the subroutine 88 advances to step 98.

In step 96, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 88 advances to step 98.

In step 98, the processing unit 29 determines if a trigger point associated with the average value of the items in the transaction table has been exceeded. In particular, the processing unit 29 communicates with the memory device 35 to determine the average value of the items in the transaction table. If the average value of the items in the transaction table is below the trigger point associated therewith, the subroutine 88 advances to step 100. If the average value of the items in the transaction table is greater than the trigger point associated therewith, the subroutine 88 ends thereby advancing to step 82 of the routine 56 (see FIG. 8).

In step 100, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 88 then ends thereby advancing to step 82 in the routine 56 (see FIG. 8).

As discussed above, in step 82 the processing unit 29 monitors the communication line 49 from the data input device 27 and the communication line 44 from the display monitor 26 to determine whether the customer has more items to be entered. In particular, a message is displayed on the display monitor 26 instructing the customer to touch a particular touch screen area displayed on the display monitor 26, or to touch a particular key associated with the data input device 27, when the customer has completed entering all of the items for purchase.

If a particular signal is detected on either of the communication lines 44 or 49, the processing unit 29 determines that the checkout procedure is complete and the routine 56 advances to the finalization step 58 (see FIG. 7). If a particular signal is not detected on the either the communication lines 44 or 49, the routine advances to step 62.

Returning now to step 70 (see FIG. 8), if an item is not detected thereon by the product scale 21, the routine 56 advances to step 86. In step 86, the processing unit 29 scans or reads the data communication line 49 to determine if a customer manually entered product information associated with an item via the data input device 27. More specifically, the data input device 27 generates an output signal which is sent to the processing unit 29 once the data input device 27 has detected a customer entering product information associated with an item. If the data input device 27 detects product information associated with an item being entered, the routine 56 advances to step 102. If the data input device 27 does not detect product information associated with an item being entered, the routine 56 advances to step 104.

In step 102, the processing unit 29 adds a record of the item manually entered in step 86 to the transaction table. More specifically, the processing unit 29 communicates with the network 33 to obtain the product information (e.g. description and price) of the manually entered item. Thereafter, the processing unit 29 updates the transaction table. More specifically, the processing unit 29 generates an output signal which is sent to the memory device 35 which causes the transaction table to be updated in the memory device 35 to include the product information associated with the manually entered item. The routine 56 then advances to a manual entry subroutine 106.

Figure 11:
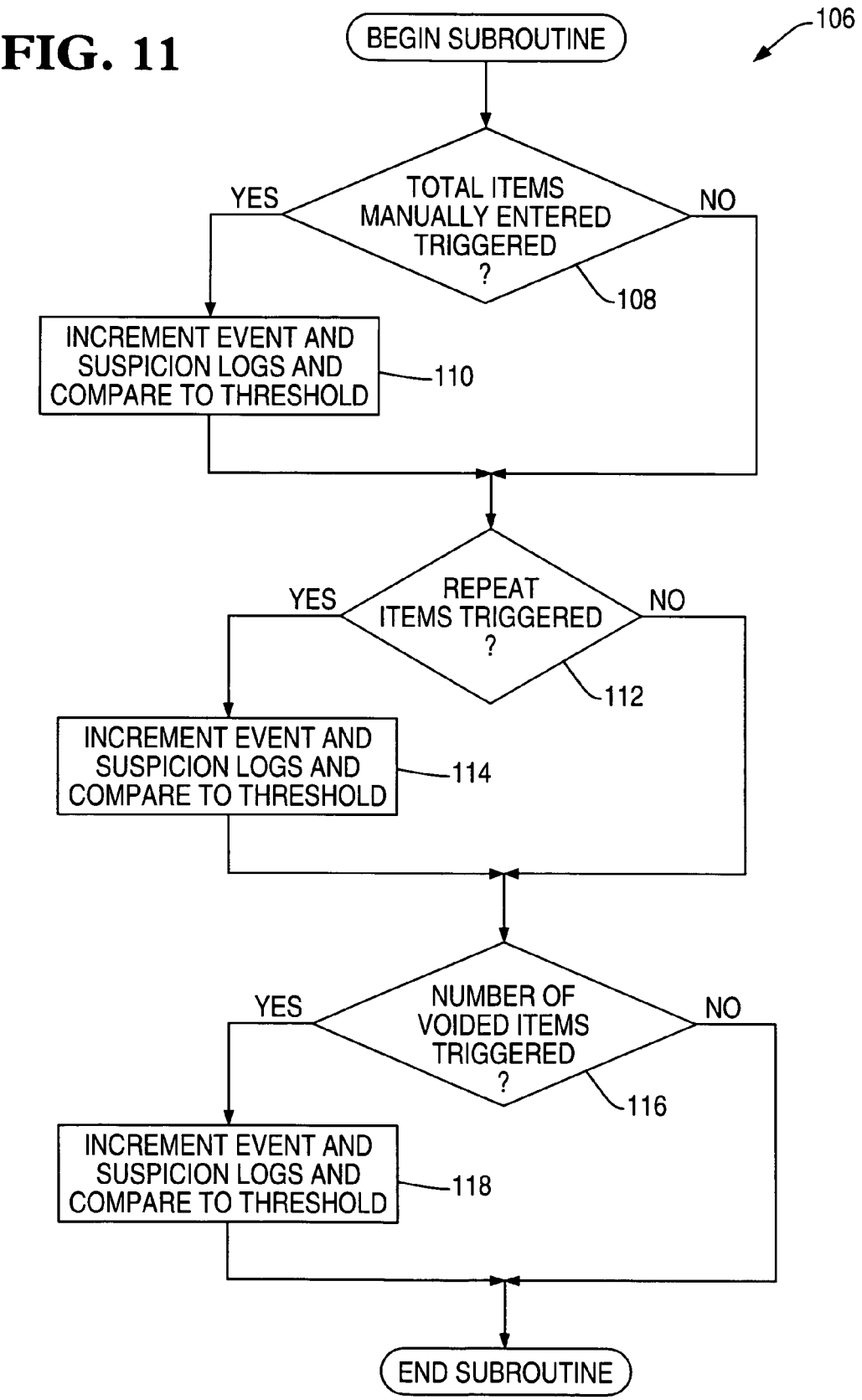
FIG. 11 is a flowchart setting forth in detail the manual entry subroutine 106 of the itemization step of FIG. 8.

Referring now to FIG. 11, there is shown a flow chart setting forth the manual entry subroutine 106 in greater detail. After completion of step 102 (see FIG. 8), the subroutine 106 advances to step 108. In step 108, the processing unit 29 determines if a trigger point associated with the number of items which have been manually entered has been exceeded. In particular, the processing unit 29 communicates with the memory device 35 to determine the number of items in the transaction table that have been manually entered via the data input device 27. If the number of items that have been manually entered is greater than the trigger point associated therewith, the subroutine 106 advances to step 110. If the number of items that have been manually entered is less than the trigger point associated therewith, the subroutine 106 advances to step 112.

In step 110, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 106 then advances to step 112.

In step 112, the processing unit 29 determines if a trigger point associated with the number of identical items included in the transaction table has been exceeded. In particular, the processing unit 29 communicates with the memory device 35 to determine the number of previously entered items in the transaction table that have identical product information associated therewith as the item that was manually entered in step 86 (see FIG. 8). If the number of identical items in the transaction table is greater than the trigger point associated therewith, the subroutine 106 advances to step 114. If the number of identical items in the transaction table is less than the trigger point associated therewith, the subroutine 106 advances to step 116.

In step 114, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 106 advances to step 116.

In step 116, the processing unit 29 determines if a trigger point associated with the number of voided items has been exceeded. In particular, the processing unit 29 communicates with the memory device 35 to determine the number of voided items in the transaction table. If the number of voided items in the transaction table is greater than the trigger point associated therewith, the subroutine 106 advances to step 118. If the number of voided items in the transaction table is less than the trigger point associated therewith, the subroutine 106 ends thereby advancing to step 82 of the routine 56 (see FIG. 8).

In step 118, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 106 then ends thereby advancing to step 82 in the routine 56 (see FIG. 8).

As discussed above, in step 82 the processing unit 29 monitors the communication line 49 from the data input device 27 and the communication line 44 from the display monitor 26 to determine whether the customer has more items to be entered. In particular, a message is displayed on the display monitor 26 instructing the customer to touch a particular touch screen area displayed on the display monitor 26, or to touch a particular key associated with the data input device 27, when the customer has completed entering all of the items for purchase.

If a particular signal is detected on either of the communication lines 44 or 49, the processing unit 29 determines that the checkout procedure is complete and the routine 56 advances to the finalization step 58 (see FIG. 7). If a particular signal is not detected on the either the communication lines 44 or 49, the routine advances to step 62.

Returning now to step 86 (see FIG. 8), if the data input device 27 did not detect product information associated with an item being entered, the routine 56 advances to step 104. In step 104, the processing unit 29 scans or reads the data communication lines 49, 40 to determine if a customer is entering information associated with a coupon via the data input device 27 or the scanner 22, respectively. More specifically, the data input device 27 or the scanner 22 generates an output signal which is sent to the processing unit 29 once the data input device 27 or the scanner 22 has detected a customer entering information associated with a coupon. If the data input device 27 or the scanner 22 detects information associated with a coupon being entered, the routine 56 advances to step 120. If the data input device 27 or the scanner 22 does not detect information associated with a coupon being entered, the routine 56 advances to step 122.

In step 120, the processing unit 29 adds a record of the coupon entered in step 104 to the transaction table. More specifically, the processing unit 29 communicates with the network 33 to obtain the information (e.g. value) associated with the coupon. Thereafter, the processing unit 29 updates the transaction table. More specifically, the processing unit 29 generates an output signal which is sent to the memory device 35 which causes the transaction table to be updated in the memory device 35 to include the information associated with the coupon. The routine 56 then advances to a coupon subroutine 124.

Figure 12A:
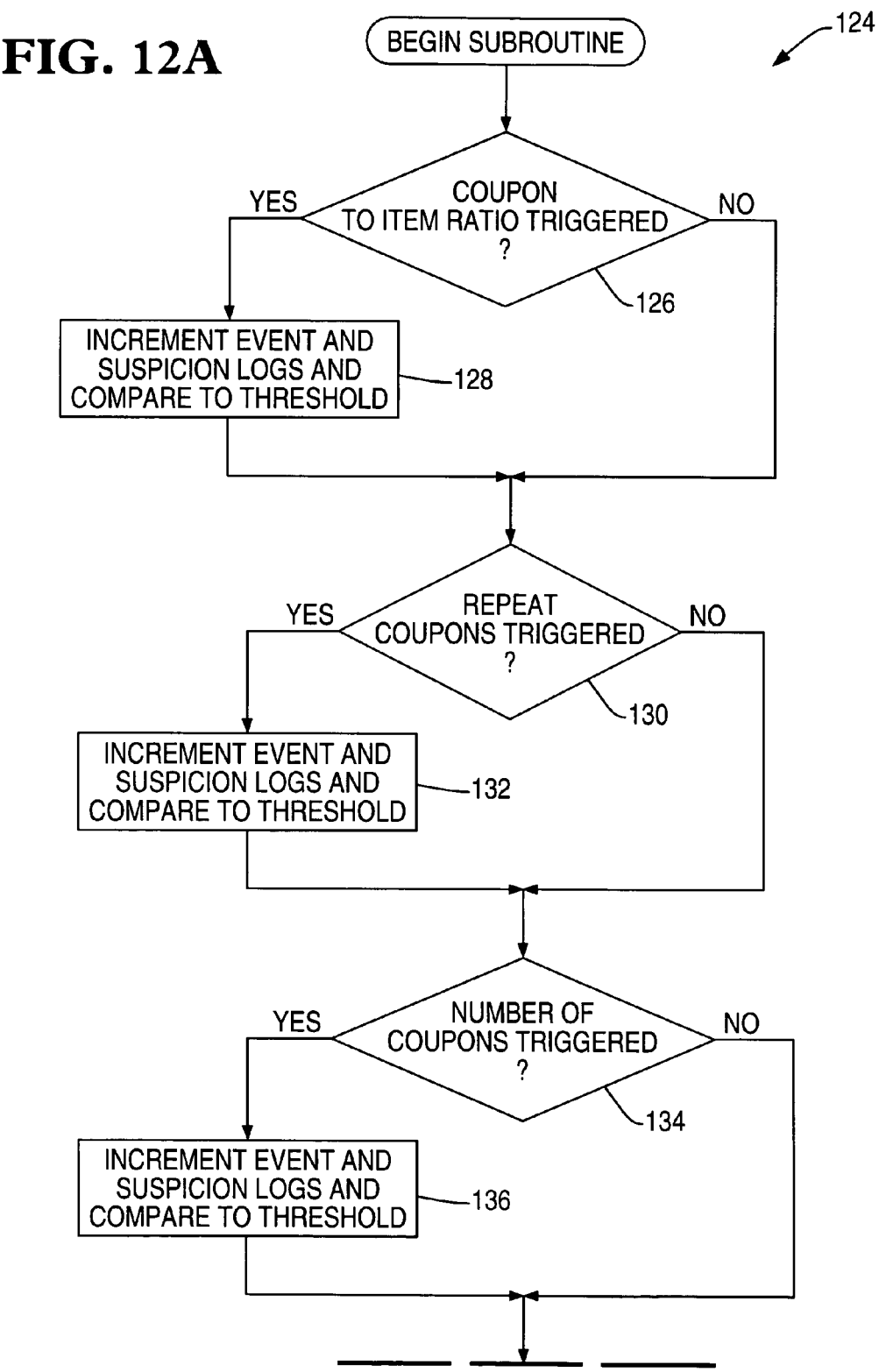
FIGS. 12A–12B are flowcharts setting forth in detail the coupon subroutine 126 of the general procedure of FIG. 8.
Figure 12B:
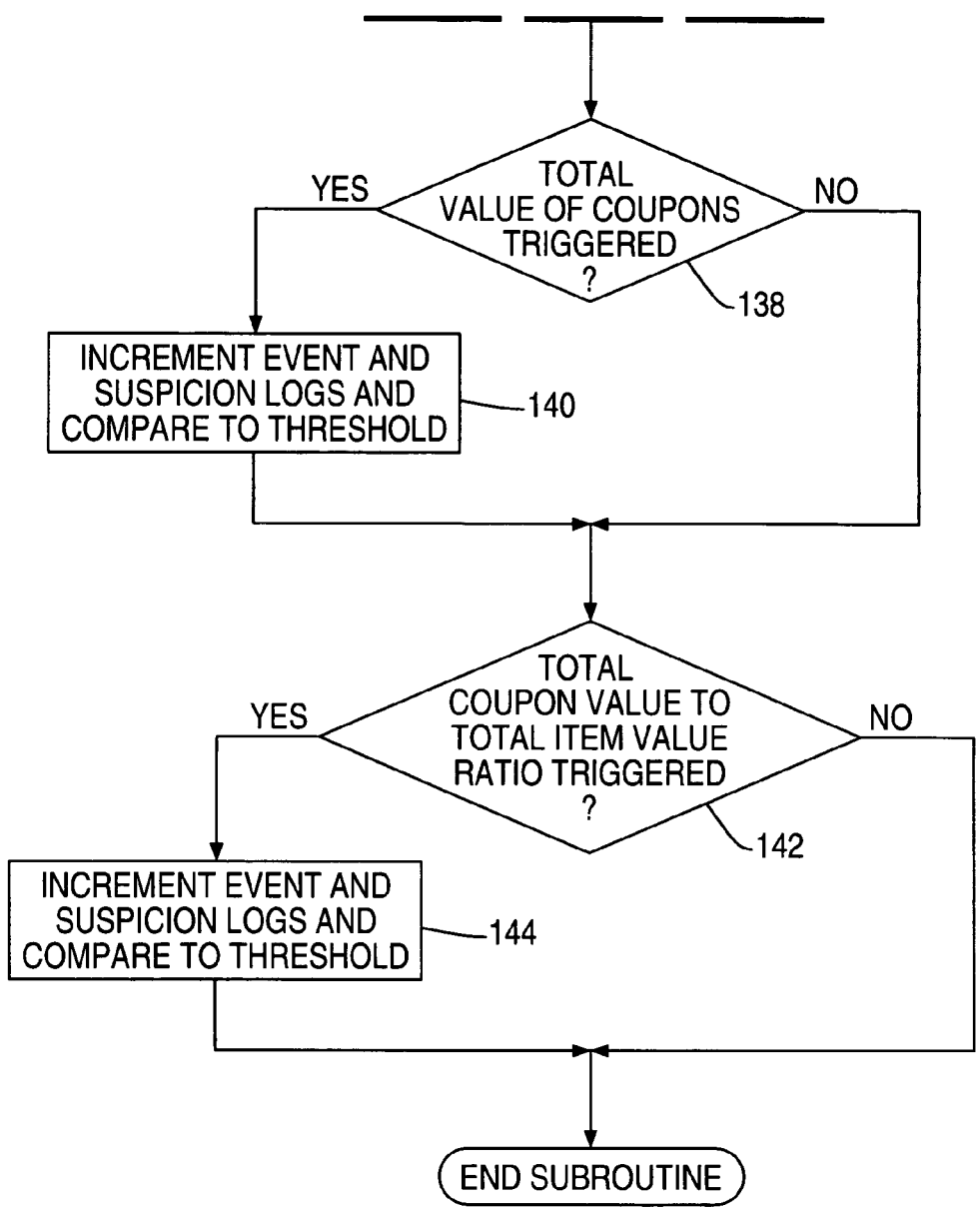

Referring now to FIG. 12, there is shown a flow chart setting forth the coupon subroutine 124 in greater detail. After completion of step 120 (see FIG. 8), the subroutine 124 advances to step 126. In step 126, the processing unit 29 determines if a trigger point associated with the ratio of the coupon value to the item value has been exceeded. In particular, the processing unit 29 communicates with the memory device 35 to determine the value of the item in the transaction table that is associated with the coupon that was entered in step 104 (see FIG. 8). If the coupon value exceeds a predetermined percentage of the value of the item thereby exceeding the trigger point associated therewith, the subroutine 124 advances to step 128. If the coupon value does not exceed a predetermined percentage of the value of the item thereby not exceeding the trigger point associated therewith, the subroutine 124 advances to step 130.

In step 128, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 124 then advances to step 130.

In step 130, the processing unit 29 determines if a trigger point associated with the number of identical coupons in the transaction table has been exceeded. In particular, the processing unit 29 communicates with the memory device 35 to determine the number of previously entered coupons in the transaction table that have identical information associated therewith as the coupon that was entered in step 104 (see FIG. 8). If the number of identical coupons in the transaction table is greater than the trigger point associated therewith, the subroutine 124 advances to step 132. If the number of identical coupons in the transaction table is less than the trigger point associated therewith, the subroutine 124 advances to step 134.

In step 132, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 124 advances to step 134.

In step 134, the processing unit 29 determines if a trigger point associated with the total number of coupons in the transaction table has been exceeded. In particular, the processing unit 29 communicates with the memory device 35 to determine the total number of coupons in the transaction table. If the total number of coupons is greater than the trigger point associated therewith, the subroutine 124 advances to step 136. If the total number of coupons is less than the trigger point associated therewith, the subroutine 124 advances to step 138.

In step 136, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 124 advances to step 138.

In step 138, the processing unit 29 determines if a trigger point associated with the total value of the coupons in the transaction table has been exceeded. In particular, the processing unit 29 communicates with the memory device 35 to determine the total value of the coupons in the transaction table. If the total value of the coupons included in the transaction table is greater than the trigger point associated therewith, the subroutine 124 advances to step 140. If the total value of the coupons included in the transaction table is less than the trigger point associated therewith, the subroutine 124 advances to step 142.

In step 140, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 124 advances to step 142.

In step 142, the processing unit 29 determines if a trigger point associated with the ratio of the total coupon value to the total item value has been exceeded. In particular, the processing unit 29 communicates with the memory device 35 to determine (1) the total value of the items in the transaction table, and (2) the total value of the coupons in the transaction table. If the total coupon value exceeds a predetermined percentage of the total value of the items thereby exceeding the trigger point associated therewith, the subroutine 124 advances to step 144. If the coupon value does not exceed a predetermined percentage of the value of the item thereby not exceeding the trigger point associated therewith, the subroutine 124 then ends thereby advancing to step 82 in the routine 56 (see FIG. 8).

In step 144, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the subroutine 124 then ends thereby advancing to step 82 in the routine 56 (see FIG. 8).

As discussed above, in step 82 the processing unit 29 monitors the communication line 49 from the data input device 27 and the communication line 44 from the display monitor 26 to determine whether the customer has more items to be entered. In particular, a message is displayed on the display monitor 26 instructing the customer to touch a particular touch screen area displayed on the display monitor 26, or to touch a particular key associated with the data input device 27, when the customer has completed entering all of the items for purchase.

If a particular signal is detected on either of the communication lines 44 or 49, the processing unit 29 determines that the checkout procedure is complete and the routine 56 advances to the finalization step 58 (see FIG. 7). If a particular signal is not detected on the either the communication lines 44 or 49, the routine advances to step 62.

Returning now to step 104 (see FIG. 8), if information associated with a coupon is not entered into the data input device 27 or the scanner 22, the routine 56 advances to step 122. In step 122, the processing unit 29 determines that a customer (1) did not properly scan an item across the scanner 22 because an output signal was not detected on the data communication line 40, (2) did not properly weigh and thereby enter product information associated with an item via the product scale 21 because an output signal was not detected on the data communication line 48, (3) did not properly manually enter product information associated with an item via the data input device 27 because an output signal was not detected on the data communication line 49, and (4) did not properly enter information associated with a coupon via the data input device 27 or the scanner 22 because a valid output signal was not detected on the data communication lines 49 or 40, respectively. Therefore, the processing unit 29 determines that the output signal present in step 62 was not associated with the proper entry of an item or coupon, but instead the result of invalid code or other type of unsuccessful entry attempt. The routine 56 then advances to step 82.

As discussed above, in step 82 the processing unit 29 monitors the communication line 49 from the data input device 27 and the communication line 44 from the display monitor 26 to determine whether the customer has more items to be entered. In particular, a message is displayed on the display monitor 26 instructing the customer to touch a particular touch screen area displayed on the display monitor 26, or to touch a particular key associated with the data input device 27, when the customer has completed entering all of the items for purchase.

If a particular signal is detected on either of the communication lines 44 or 49, the processing unit 29 determines that the checkout procedure is complete and the routine 56 advances to the finalization step 58 (see FIG. 7). If a particular signal is not detected on the either the communication lines 44 or 49, the routine advances to step 62.

Returning now to step 62, if output signals are not present on the data communication lines 40, 48, or 49, the routine 56 advances to step 66. In step 66, the processing unit determines if an excessive amount of time has elapsed since the customer's last successful entry. In particular, the processing unit 29 communicates with the memory device 35 to determine the amount of time which has elapsed since the last entry into the transaction table. If the amount of time since the last entry exceeds a predetermined value thereby exceeding the trigger point associated therewith, the routine 56 advances to step 146. If the amount of time since the last entry does not exceed a predetermined value thereby not exceeding the trigger point associated therewith, the routine 56 advances to step 146.

In step 146, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the routine 56 advances to step 82.

As discussed above, in step 82 the processing unit 29 monitors the communication line 49 from the data input device 27 and the communication line 44 from the display monitor 26 to determine whether the customer has more items to be entered. In particular, a message is displayed on the display monitor 26 instructing the customer to touch a particular touch screen area displayed on the display monitor 26, or to touch a particular key associated with the data input device 27, when the customer has completed entering all of the items for purchase.

If a particular signal is detected on either of the communication lines 44 or 49, the processing unit 29 determines that the checkout procedure is complete and the routine 56 advances to the finalization step 58 (see FIG. 7). If a particular signal is not detected on the either the communication lines 44 or 49, the routine advances to step 62.

Returning now to step 66, if the amount of time since the last entry does not exceed a predetermined value thereby not exceeding the trigger point associated therewith, the routine 56 advances to step 148. In step 148, the processing unit determines if an excessive amount of time has elapsed since the customer began the checkout operation. In particular, the processing unit 29 communicates with the memory device 35 to determine the amount of time which has elapsed since the completed the initialization step 54 (see FIG. 7). If the amount of time since the customer completed the initialization step 54 exceeds a predetermined value thereby exceeding the trigger point associated therewith, the routine 56 advances to step 150. If the amount of time since the customer completed the initialization step 54 does not exceed a predetermined value thereby not exceeding the trigger point associated therewith, the routine 56 advances to step 152.

In step 150, the processing unit 29 increments the event log and the suspicion log by a predetermined value. More specifically, the processing unit 29 generates an output signal which is sent to the memory device 35 which causes the event log to be incremented in the memory device 35 by a value of one, and the suspicion log to be incremented in the memory device 35 by a value of one-half.

Thereafter, the processing unit 29 determines if the total value of either the event log or the suspicion log exceeds the respective predetermined threshold value for each log. More specifically, if the event log exceeds its predetermined threshold value, the processing unit 29 causes an output signal to be sent to the network 33 which in turn pages or otherwise summons the retailer's personnel in order to assist the customer. In addition, if the suspicion log exceeds its predetermined threshold value, the processing unit 29 causes an output signal to be sent to the network 33 which in turn pages or otherwise summons the retailer's personnel such as security personnel to audit or otherwise investigate the customer's transaction. If neither the event log nor the suspicion log exceeds its respective threshold value, the routine 56 advances to step 82.

As discussed above, in step 82 the processing unit 29 monitors the communication line 49 from the data input device 27 and the communication line 44 from the display monitor 26 to determine whether the customer has more items to be entered. In particular, a message is displayed on the display monitor 26 instructing the customer to touch a particular touch screen area displayed on the display monitor 26, or to touch a particular key associated with the data input device 27, when the customer has completed entering all of the items for purchase.

If a particular signal is detected on either of the communication lines 44 or 49, the processing unit 29 determines that the checkout procedure is complete and the routine 56 advances to the finalization step 58 (see FIG. 7). If a particular signal is not detected on the either the communication lines 44 or 49, the routine advances to step 62.

Returning now to step 148, if the amount of time since the customer completed the initialization step 54 does not exceed a predetermined value thereby not exceeding the trigger point associated therewith, the routine 56 advances to step 152. In step 152, since (1) output signals were not present on the data communication lines 40, 48, or 49 indicating that an entry attempt was occurring, (2) the processing unit 29 did not determine that excessive time had elapsed since the customer's last successful entry, and (3) the processing unit 29 did not determine that excessive time had elapsed since the customer completed the itemization step 54 (see FIG. 7), the processing unit 29 concludes that there is no present attempt being made by a customer to scan or otherwise enter an item or coupon. Thus, the routine 56 advances to step 82 to loop through the routine 56 once again.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, the routine 56 may be modified to include steps in which the value of the suspicion log is reduced if the customer is identified as a "preferred customer". In particular, if the customer is identified as a customer which frequents the retailer via the information encoded on his or her smart card during the initialization step 54 (see FIG. 7), certain trigger points (e.g. total item value) may not cause the suspicion log to be incremented.

What is claimed is:

1. A method of providing security during operation of a self-service checkout terminal, comprising the steps of:
   creating a transaction table which includes a plurality of records corresponding respectively to a plurality of items entered into the checkout terminal during a checkout procedure;
   analyzing the plurality of records;
   generating a characteristic value in response to the analyzing step;
   comparing the characteristic value to a characteristic trigger point and generating a characteristic control signal in response thereto;
   updating an electronic log value based on the characteristic control signal; and
   comparing the log value to a log threshold and generating a personnel signal in response thereto.

2. The method of claim 1, wherein:
   the analyzing step includes the step of calculating the number of identical records of a respective item contained in the plurality of records,
   the generating step includes the step of generating an identical item value in response to the calculating step, and
   the comparing step includes the step of comparing the identical item value to an identical item trigger point and generating an identical item control signal in response thereto.

3. The method of claim 1, wherein:
   the analyzing step includes the step of calculating the average dollar amount of the items contained in the plurality of records,
   the generating step includes the step of generating an average item value in response to the calculating step, and
   the comparing step includes the step of comparing the average item value to an average item value trigger point and generating an average item control signal in response thereto.

4. The method of claim 1, wherein:
   the analyzing step includes the step of calculating the number of records contained in the plurality of records corresponding to items from a common store department,
   the generating step includes the step of generating a common department value in response to the calculating step, and
   the comparing step includes the step of comparing the common department value to a common department trigger point and generating a common department control signal in response thereto.

5. The method of claim 1, wherein:
   the analyzing step includes the step of calculating the number of records contained in the plurality of records corresponding to items which were manually entered,
   the generating step includes the step of generating a manually entered value in response to the calculating step, and
   the comparing step includes the step of comparing the manually entered value to a manually entered trigger point and generating a manually entered control signal in response thereto.

6. The method of claim 1, wherein:
   the analyzing step includes the step of calculating the number of records contained in the plurality of records corresponding to items which were voided,
   the generating step includes the step of generating a item voided value in response to the calculating step, and
   the comparing step includes the step of comparing the item voided value to an item voided trigger point and generating an item voided control signal in response thereto.

7. The method of claim 1, wherein:
   the plurality of records includes (1) a grocery record corresponding to a grocery item, and (2) a coupon record corresponding to a coupon associated with the grocery item,
   the analyzing step includes the step of calculating the ratio between the dollar amount of the grocery record and the dollar amount of the coupon record,
   the generating step includes the step of generating a ratio value in response to the calculating step, and the comparing step includes the step of comparing the ratio value to a ratio trigger point and generating a ratio control signal in response thereto.

8. The method of claim 1, wherein:
the plurality of records includes a plurality of coupon records corresponding respectively to a plurality of coupons entered into the checkout terminal during the checkout procedure,
the analyzing step includes the step of calculating the number of identical coupon records of a respective coupon contained in the plurality of records,
the generating step includes the step of generating an identical coupon value in response to the calculating step, and
the comparing step includes the step of comparing the identical coupon value to an identical coupon trigger point and generating an identical coupon control signal in response thereto.

9. The method of claim 1, wherein:
the plurality of records includes a plurality of coupon records corresponding respectively to a plurality of coupons entered into the checkout terminal during the checkout procedure,
the analyzing step includes the step of calculating the number of coupon records contained in the plurality of records,
the generating step includes the step of generating a number-of-coupons value in response to the calculating step, and
the comparing step includes the step of comparing the number-of-coupons value to a number-of-coupons trigger point and generating a umber-of-coupons control signal in response thereto.

10. The method of claim 1, wherein:
the plurality of records includes a plurality of coupon records corresponding respectively to a plurality of coupons entered into the checkout terminal during the checkout procedure,
the analyzing step includes the step of calculating the total dollar amount of all of the coupon records contained in the plurality of records,
the generating step includes the step of generating a coupon total value in response to the calculating step, and
the comparing step includes the step of comparing the coupon total value to a coupon total trigger point and generating a coupon total control signal in response thereto.

11. The method of claim 1, wherein:
the plurality of records includes (1) a plurality of grocery records corresponding respectively to a plurality of grocery items, and (2) a plurality of coupon records corresponding respectively to a plurality of coupons,
the analyzing step includes the step of calculating the ratio between the dollar amount of the sum of the grocery records and the dollar amount of the sum of the coupon records,
the generating step includes the step of generating a sum ratio value in response to the calculating step, and
the comparing step includes the step of comparing the sum ratio value to a sum ratio trigger point and generating a sum ratio control signal in response thereto.

12. The method of claim 1, wherein:
the plurality of records includes a first record and a second record,
the analyzing step includes the step of calculating a time lapse between entry of the first record and entry of the second record,
the generating step includes the step of generating an item time lapse value in response to the calculating step, and
the comparing step includes the step of comparing the item time lapse value to an item time lapse trigger point and generating an item time lapse control signal in response thereto.

13. The method of claim 1, wherein the creating step includes a step selected from the group consisting of (1) scanning an identification code associated with the item with a scanner device, (2) obtaining a weight associated with the item with a scale and thereafter entering the identification code associated with the item with a data input device, and (3) entering the identification code associated with the item with the data input device.

14. The method of claim 1, further comprising the step of summoning retail personnel to investigate a customers transaction in response to generation of the personnel signal.

15. The method of claim 14, wherein the summoning step includes the step of paging retail personnel.

16. The method of claim 1, wherein the characteristic control signal is generated in response to the characteristic value exceeding the characteristic trigger point.

17. The method of claim 16, wherein the personnel signal is generated in response to the log value exceeding the log threshold.

18. A method of providing security during operation of a self-service checkout terminal, comprising the steps of:
creating a transaction table which includes a plurality of records corresponding respectively to a plurality of items entered into the checkout terminal during a checkout procedure;
analyzing the plurality of records to determine the number of identical records of a respective item contained in the plurality of records;
generating an identical item value in response to the analyzing step; and
comparing the identical item value to an identical item trigger point and generating an identical item control signal in response thereto.

19. The method of claim 18, further comprising the steps of:
updating an electronic log value based on the identical item control signal; and
comparing the log value to a log threshold and generating a personnel signal in response thereto.

20. The method of claim 18, further comprising the steps of:
analyzing the plurality of records to determine the average dollar amount of the items contained in the plurality of records;
generating an average item value in response to the analyzing step; and
comparing the average item value to an average item trigger point and generating an average item control signal in response thereto.

21. The method of claim 19, further comprising the step of summoning retail personnel to investigate a customers transaction in response to generation of the personnel signal.

22. The method of claim 21, wherein the summoning step includes the step of paging retail personnel.

23. The method of claim 18, wherein the identical item control signal is generated in response to the identical item value exceeding the identical item trigger point.

24. The method of claim 19, wherein the personnel signal is generated in response to the log value exceeding the log threshold.

25. A method of providing security during operation of a self-service checkout terminal, comprising the steps of:

creating a transaction table which includes a plurality of records corresponding respectively to a plurality of items entered into the checkout terminal during a checkout procedure;

analyzing the plurality of records to determine the average dollar amount of the items contained in the plurality of records;

generating an average item value in response to the analyzing step; and comparing the average item value to an average item trigger point and generating an average item control signal in response thereto.

26. The method of claim 25, further comprising the steps of:

updating an electronic log value based on the average item control signal; and comparing the log value to a log threshold and generating a personnel signal in response thereto.

27. The method of claim 26, further comprising the stop of summoning retail personnel to investigate a customer's transaction in response to generation of the personnel signal.

28. The method of claim 27, wherein the summoning step includes the step of paging retail personnel.

29. The method of claim 25, wherein the average item control signal is generated in response to the average item value exceeding the average item trigger point.

30. The method of claim 26, wherein the personnel signal is generated in response to the log value exceeding the log threshold.

* * * * *

UNITED STATES PATENT AND TRADEMARK OFFICE
CERTIFICATE OF CORRECTION

PATENT NO. : 7,016,862 B1 Page 1 of 1
APPLICATION NO. : 09/020057
DATED : March 21, 2006
INVENTOR(S) : J. Walter and A. Vassigh It is certified that error appears in the above-identified patent and that said Letters Patent is hereby corrected as shown below:

Column 23, Line 32, after "a", delete "umber" and insert --number--

Signed and Sealed this

Twenty-sixth Day of May, 2009

JOHN DOLL
*Acting Director of the United States Patent and Trademark Office*